(12) United States Patent
Nishikawa et al.

(10) Patent No.: US 12,496,931 B2
(45) Date of Patent: Dec. 16, 2025

(54) INFORMATION PROCESSING METHOD, AND INFORMATION PROCESSING SYSTEM

(71) Applicant: PANASONIC INTELLECTUAL PROPERTY MANAGEMENT CO., LTD., Osaka (JP)

(72) Inventors: Shinya Nishikawa, Osaka (JP); Changhui Yang, Osaka (JP); Takashi Iida, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 503 days.

(21) Appl. No.: 18/003,816

(22) PCT Filed: Jun. 28, 2021

(86) PCT No.: PCT/JP2021/024333
§ 371 (c)(1),
(2) Date: Dec. 29, 2022

(87) PCT Pub. No.: WO2022/009718
PCT Pub. Date: Jan. 13, 2022

(65) Prior Publication Data
US 2023/0256863 A1    Aug. 17, 2023

(30) Foreign Application Priority Data

Jul. 10, 2020 (JP) ................................ 2020-119212

(51) Int. Cl.
*B60L 58/16* (2019.01)
*G06Q 30/02* (2023.01)
(52) U.S. Cl.
CPC .......... *B60L 58/16* (2019.02); *G06Q 30/0278* (2013.01)

(58) Field of Classification Search
CPC .. B60L 58/16; B60L 2240/70; B60L 2260/44; B60L 2260/54; G06Q 30/0278;
(Continued)

(56) References Cited

U.S. PATENT DOCUMENTS 9,520,735 B2 * 12/2016 Tomita ................ H01M 10/441
2019/0386351 A1 * 12/2019 Kim .................. H02J 7/007192

FOREIGN PATENT DOCUMENTS

| CN | 109383323 A | * | 2/2019 | ............. B60L 53/60 |
| JP | 2018-515054 A |   | 6/2018 | |
| WO | 2016/138055 A1 |   | 9/2016 | |

OTHER PUBLICATIONS

International Search Report dated Aug. 24, 2021 issued in International Patent Application No. PCT/JP2021/024333, with English translation.

* cited by examiner

*Primary Examiner* — Tung S Lau
(74) *Attorney, Agent, or Firm* — Rimon P.C.

(57) ABSTRACT

An information processing device acquires charge/discharge information indicating a charge/discharge amount per unit period of a battery having a plurality of cells; acquires first relationship information indicating a relationship between the charge/discharge amount per the unit period and a deterioration degree of the battery; acquires second relationship information indicating a relationship between an elapsed time or the charge/discharge amount, and a voltage difference generated between the plurality of cells; acquires first cost information indicating a first cost generated by deterioration of the battery and second cost information indicating a second cost required for reducing the voltage difference; and determines, on the basis of the charge/discharge information, the first and second relationship information, and the first cost and second information, work (Continued)

timing at which the work in a charge/discharge plan is performed, the work timing being timing at which a sum of the first and second cost satisfies a predetermined requirement.

9 Claims, 14 Drawing Sheets

(58) Field of Classification Search
CPC ........ G06Q 50/06; G06Q 50/10; Y02E 60/10; Y02T 10/70; B60K 6/28; H01M 10/48; H02J 3/00; H02J 7/00; H02J 13/00
See application file for complete search history.

FIG.5

| VEHICLE | DATE OF PURCHASE | TOTAL TRAVEL DISTANCE (km) | SoH | TRAVEL DISTANCE (km/DAY) | MAXIMUM CELL VOLTAGE (V) | MINIMUM CELL VOLTAGE (V) |
|---|---|---|---|---|---|---|
| VEHICLE A | ○○○ | ×××  | △△△ | □□□ | ○○○ | ××× |
| VEHICLE B | ××× | △△△ | □□□ | ○○○ | ××× | △△△ |
| VEHICLE C | △△△ | □□□ | ○○○ | ××× | △△△ | □□□ |
| VEHICLE D | □□□ | ○○○ | ××× | △△△ | □□□ | ○○○ |

FIG.6

| PROPERTY | ITEM | UNIT PRICE |
|---|---|---|
| VEHICLE NUMBER-LINKED | DRIVER LABOR COST | ○○○ |
| | VEHICLE MAINTENANCE COST | ×××  |
| DETERIORATION-LINKED | VEHICLE PURCHASE COST | △△△ |
| | VOLTAGE ADJUSTMENT WORK COST | ○○○ |
| FIXED | OPERATING COST | □□□ |

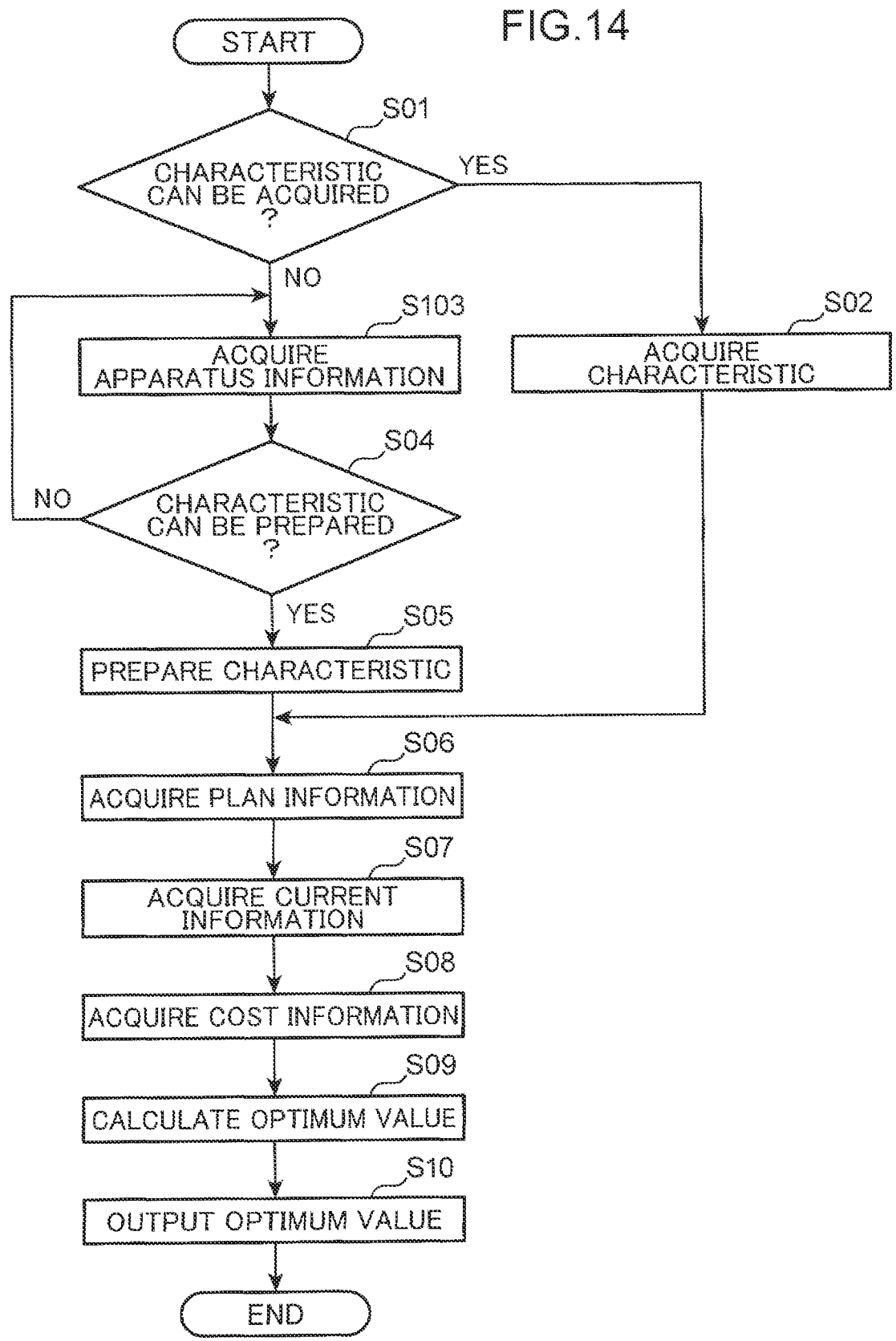

INFORMATION PROCESSING METHOD, AND INFORMATION PROCESSING SYSTEM

CROSS REFERENCE TO RELATED APPLICATIONS

This application is the U.S. National Phase under 35 U.S.C. § 371 of International Patent Application No. PCT/JP2021/024333, filed on Jun. 28, 2021 which in turn claims the benefit of Japanese Patent Application No. 2020-119212, filed on Jul. 10, 2020, the entire disclosures of which Applications are incorporated by reference herein.

TECHNICAL FIELD

The present disclosure relates to an information processing method and an information processing system.

BACKGROUND ART

Patent Literature 1 below discloses a technique for determining whether or not to perform rebalancing of a plurality of cells included in a battery pack on the basis of the number of times of charging of the battery pack.

In the technique disclosed in Patent Literature 1, since rebalancing is performed every predetermined number of times of charging, timing of rebalancing might not be appropriate from a viewpoint of cost of the battery.

CITATION LIST

Patent Literature

Patent Literature 1: JP 2018-515054 T

SUMMARY OF INVENTION

An object of the present disclosure is to provide a technique enabling determination of appropriate timing for performing work for reducing a voltage difference generated between a plurality of cells of a battery from a viewpoint of cost of the battery.

An information processing method according to one aspect of the present disclosure includes, by an information processing device: acquiring charge/discharge information indicating information corresponding to a charge/discharge amount per unit period of a battery provided in an electric apparatus driven by the battery, the battery having a plurality of cells, and the charge/discharge amount including at least one of a charge amount and a discharge amount of the battery; acquiring first relationship information indicating a relationship between the information corresponding to the charge/discharge amount per the unit period and a deterioration degree of the battery; acquiring second relationship information indicating a relationship between an elapsed time or the charge/discharge amount, and a voltage difference generated between the plurality of cells; acquiring first cost information indicating a first cost generated by deterioration of the battery and second cost information indicating a second cost required for work for reducing the voltage difference; determining, on the basis of the charge/discharge information, the first relationship information, the second relationship information, the first cost information, and the second cost information, work timing at which the work in a charge/discharge plan is performed, the work timing being timing at which a sum of the first cost and the second cost satisfies a predetermined requirement; and causing a presentation device to present information indicating the work timing.

BRIEF DESCRIPTION OF DRAWINGS

FIG. 5 is a diagram illustrating an example of a current business situation at a certain business establishment.

FIG. 6 is a diagram illustrating an example of business costs at a certain business establishment.

FIG. 14 is a flowchart illustrating a flow of processing executed by a data processing unit.

Figure 1:
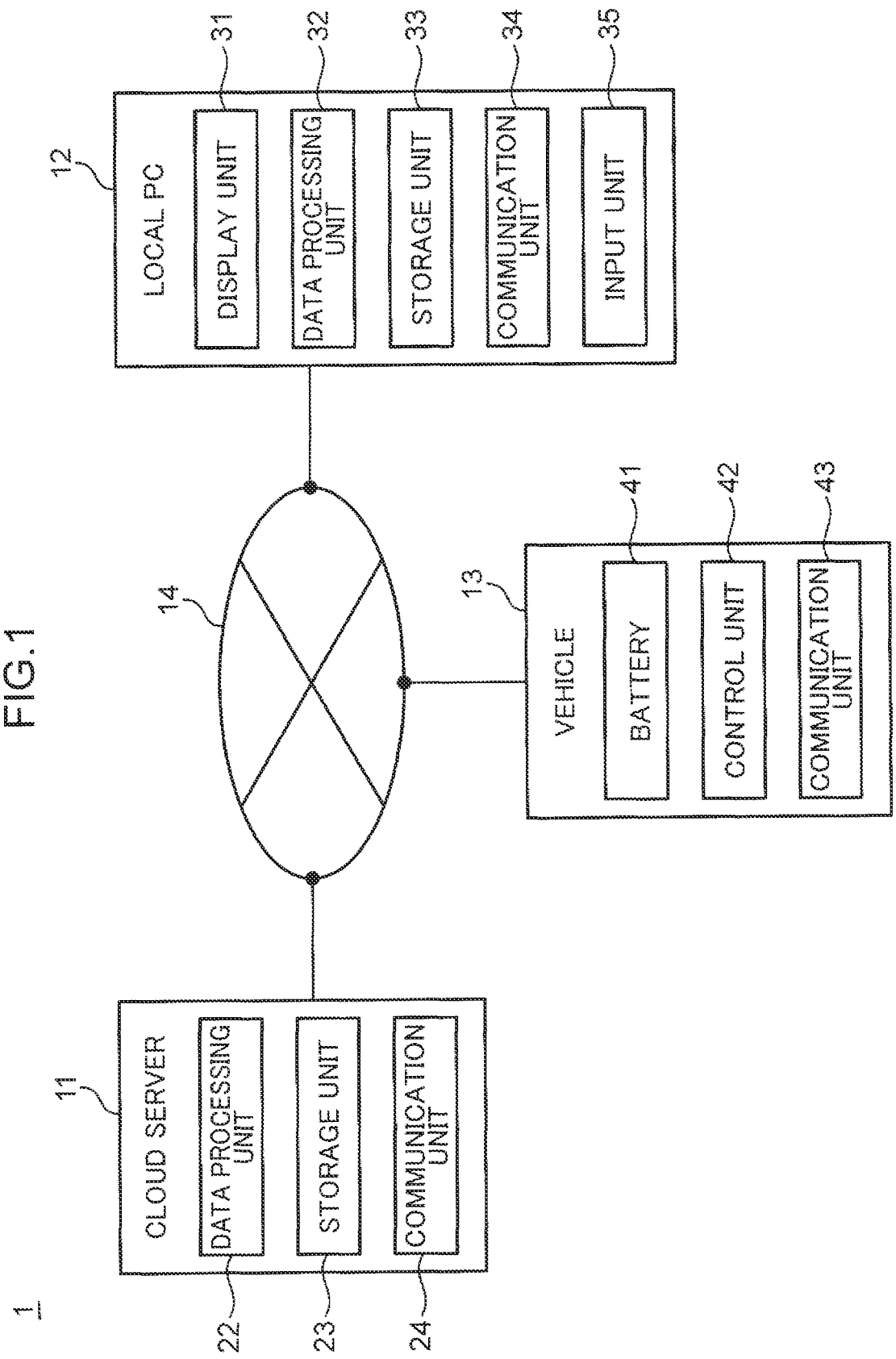
FIG. 1 is a block diagram illustrating a configuration of an information processing system according to a first embodiment of the present disclosure.

DESCRIPTION OF EMBODIMENTS (Knowledge Underlying Present Disclosure)

A product purchased through mail order using the Internet or the like is delivered to a home or the like of a customer by a home delivery agent. The home delivery agent uses a plurality of trucks to deliver a parcel in a delivery area in charge. In the future, an electric vehicle (EV) on which a battery-driven traveling motor is mounted will become widespread, and home delivery agents that deliver parcels by EV trucks is expected to increase in number.

A battery of an EV is often configured as a battery pack including a plurality of cells (battery cells) connected in series. When the EV is used for many years, a difference in remaining capacity is generated between the plurality of cells, and a cell voltage becomes unbalanced (cell imbalance). In a battery in which cell imbalance occurs, a cell having a remaining capacity of 100% and a cell having a remaining capacity of less than 100% are present together at the time of completion of charging. When discharging of a battery is started by actuation of an EV, the discharging will be stopped when the remaining capacity of the latter cell reaches an allowable lower limit value. As a result, the overall battery capacity is substantially reduced.

By mounting a well-known cell balancing circuit in a battery pack, it is possible to eliminate cell imbalance. The cell balancing circuit forcibly discharges a cell by selecting only a cell having a large remaining capacity and connecting the selected cell to a resistance element. By stopping the forced discharging when cell voltages of all the cells are equalized, cell imbalance can be eliminated. However, mounting the cell balancing circuit in the battery pack invites an increase in cost of the battery pack, and increases a manufacturing cost of an EV.

In order to avoid an increase in the cost of the EV, instead of mounting the cell balancing circuit in the battery pack, a possible method is transporting the EV in which cell imbalance occurs to a repair shop or the like to perform battery voltage adjustment work. In this voltage adjustment work, similarly to the above-described cell balancing circuit, a cell with a large remaining capacity is forcibly discharged to equalize cell voltages of all the cells, thereby eliminating cell imbalance of a battery.

However, the voltage adjustment work in a repair shop or the like is a paid work. Therefore, if the voltage adjustment work is performed at a time point when a degree of cell imbalance is low, a battery capacity recovered by the work is small, so that cost effectiveness is low. In addition, even if the voltage adjustment work is performed on a battery that has deteriorated nearly to an end of its life, it is necessary to replace an EV some time after the work, and thus, the cost effectiveness is low as well. On the other hand, if the EV is replaced every time performance of the battery deteriorates without performing the voltage adjustment work once, a vehicle purchase cost increases due to shortening of a replacement cycle. Accordingly, when it is more advantageous to carry out the voltage adjustment work than to replace the EV in terms of long-term cost, replacement timing should be postponed and the voltage adjustment work should be performed. As described above, in operating the delivery service using an EV, it is important to formulate a business plan so as to minimize a total cost of ownership (TCO) in a long term (e.g., 10 years) including not only a vehicle purchase cost accompanying replacement of a vehicle having a deteriorated battery but also a cost for voltage adjustment work for eliminating cell imbalance.

The charging and discharging system for a battery pack disclosed in Patent Literature 1 includes a charging station for charging and discharging a battery pack having a plurality of cells. The charging station includes a processor circuit. The processor circuit determines timing at which rebalancing of the plurality of cells is to be performed on the basis of a predetermined rebalancing reference and charging/discharging data of the battery pack stored in a battery pack memory.

However, Patent Literature 1 does not disclose any determination of execution timing of voltage adjustment work from a viewpoint of minimizing a long-term total cost.

In order to solve the above problem, the present inventor has acquired knowledge that it is possible to determine optimum execution timing of voltage adjustment work so as to minimize a long-term total cost by using long-term plan information, cost information, relationship information between a travel distance and a deterioration degree of a battery, and relationship information between a travel distance and cell imbalance, and has arrived at the present disclosure.

Next, each aspect of the present disclosure will be described.

An information processing method according to one aspect of the present disclosure includes, by an information processing device: acquiring charge/discharge information indicating information corresponding to a charge/discharge amount per unit period of a battery provided in an electric apparatus driven by the battery, the battery having a plurality of cells, and the charge/discharge amount including at least one of a charge amount and a discharge amount of the battery; acquiring first relationship information indicating a relationship between the information corresponding to the charge/discharge amount per the unit period and a deterioration degree of the battery; acquiring second relationship information indicating a relationship between an elapsed time or the charge/discharge amount, and a voltage difference generated between the plurality of cells; acquiring first cost information indicating a first cost generated by deterioration of the battery and second cost information indicating a second cost required for work for reducing the voltage difference; determining, on the basis of the charge/discharge information, the first relationship information, the second relationship information, the first cost information, and the second cost information, work timing at which the work in a charge/discharge plan is performed, the work timing being timing at which a sum of the first cost and the second cost satisfies a predetermined requirement; and causing a presentation device to present information indicating the work timing.

According to this configuration, the information processing device determines the work timing for performing the work for reducing the voltage difference generated between the plurality of cells of the battery such that the sum of the first cost and the second cost satisfies the predetermined requirement on the basis of the charge/discharge information, the first relationship information, the second relationship information, the first cost information, and the second cost information. As described above, by determining the work timing on the basis of the total cost of the first cost and the second cost, appropriate work timing can be determined from a viewpoint of the cost of the battery. For example, it is possible to determine optimum work timing at which a long-term total cost is minimized.

In the above aspect, the charge/discharge information is plan information or history information regarding charge/discharge.

According to this configuration, by using the plan information, the work timing can be determined before the start of use of the electric apparatus. In addition, by using the past history information, it is possible to determine the work timing in consideration of use conditions of the electric apparatus during its use.

In the above aspect, the electric apparatus is a movable body, the information corresponding to the charge/discharge amount is a moving distance of the movable body, the charge/discharge information is movement information including a moving distance per the unit period of the movable body, the battery is a battery for movement mounted on the movable body, the first relationship information indicates a relationship between the moving distance of the movable body per the unit period and the deterioration degree of the battery, the second relationship information indicates a relationship between the elapsed time or the moving distance of the movable body, and the voltage difference generated between the plurality of cells, the charge/discharge plan is a movement plan of the movable body, and the work timing is timing at which the work for use in the movement plan is performed, the work timing being timing at which the sum of the first cost and the second cost satisfies a predetermined requirement.

According to this configuration, with a battery mounted on the movable body as a target, it is possible to determine optimum work timing for performing the work for reducing the voltage difference generated between the plurality of cells of the battery.

In the above aspect, the method further includes, by the information processing device: determining planned timing that is timing for purchase, sale, or scrapping of the movable body or the battery mounted on the movable body for use in a movement plan, the planned timing being timing at which the sum of the first cost and the second cost satisfies the predetermined requirement, on the basis of the movement information, the first relationship information, the second relationship information, the first cost information, and the second cost information; and causing the presentation device to present information indicating the planned timing.

According to this configuration, the information processing device determines the planned timing regarding purchase, sale, or scrapping of the movable body or the battery so that the sum of the first cost and the second cost satisfies the predetermined requirement. As described above, by determining the planned timing on the basis of the total cost of the first cost and the second cost, appropriate planned timing can be determined from the viewpoint of the cost of the battery. For example, it is possible to determine optimum planned timing of the movable body or the battery with a minimum long-term total cost.

In the above aspect, the first cost includes a cost required for purchase, sale, or scrapping of the battery having the deterioration degree equal to or higher than a threshold or of the movable body on which the battery is mounted.

According to this configuration, by including, in the first cost, the cost required for purchase, sale, or scrapping of a battery having a deterioration degree equal to or higher than a threshold or a movable body on which the battery is mounted, an end of life of the battery or the movable body can be controlled using the threshold. Therefore, accuracy of the first cost, which is a deterioration-linked cost, can be increased.

In the above aspect, the method includes causing, by the information processing device, the presentation device to present information indicating the work timing a predetermined period before arrival of the work timing.

According to this configuration, it is possible to arrange work reservation or the like without delay by presenting the information a predetermined period before arrival of execution timing of the work.

In the above aspect, the electric apparatus is an electric storage device, the information corresponding to the charge/discharge amount is a charge/discharge amount of the electric storage device, the first relationship information indicates a relationship between a charge/discharge amount per the unit period of the electric storage device and the deterioration degree of the battery, the second relationship information indicates a relationship between the elapsed time or the charge/discharge amount of the electric storage device, and the voltage difference generated between the plurality of cells, the charge/discharge plan is a charge/discharge plan of the electric storage device, and the work timing is timing at which the work for use in the charge/discharge plan is performed, the work timing being timing at which the sum of the first cost and the second cost satisfies a predetermined requirement.

According to this configuration, with a battery mounted on the electric storage device as a target, it is possible to determine optimum work timing for performing the work for reducing the voltage difference generated between the plurality of cells of the battery.

An information processing system according to one aspect of the present disclosure includes: a first acquisition unit that acquires charge/discharge information indicating information corresponding to a charge/discharge amount per unit period of a battery provided in an electric apparatus driven by the battery, the battery having a plurality of cells, and the charge/discharge amount including at least one of a charge amount and a discharge amount of the battery; a second acquisition unit that acquires first relationship information indicating a relationship between the information corresponding to the charge/discharge amount per the unit period and a deterioration degree of the battery; a third acquisition unit that acquires second relationship information indicating a relationship between an elapsed time or the charge/discharge amount, and a voltage difference generated between the plurality of cells; a fourth acquisition unit that acquires first cost information indicating a first cost generated by deterioration of the battery and second cost information indicating a second cost required for work for reducing the voltage difference; a determination unit that determines, on the basis of the charge/discharge information, the first relationship information, the second relationship information, the first cost information, and the second cost information, work timing at which the work in a charge/discharge plan is performed, the work timing being timing at which a sum of the first cost and the second cost satisfies a predetermined requirement; and a presentation unit that presents information indicating the work timing.

According to this configuration, the determination unit determines the work timing for performing the work for reducing the voltage difference generated between the plurality of cells of the battery such that the sum of the first cost and the second cost satisfies the predetermined requirement on the basis of the charge/discharge information, the first relationship information, the second relationship information, the first cost information, and the second cost information. As described above, by determining the work timing on the basis of the total cost of the first cost and the second cost, appropriate work timing can be determined from a viewpoint of the cost of the battery. For example, it is possible to determine optimum work timing at which a long-term total cost is minimized.

The comprehensive or specific aspects of the present disclosure described above can be implemented as a system, a device, a method, an integrated circuit, a computer program, or any combination thereof. It is needless to say that such a computer program can be distributed using a computer-readable non-volatile recording medium such as a CD-ROM, or via a communication network such as the Internet.

Each of embodiments to be described below illustrates a specific example of the present disclosure. Numerical values, shapes, components, steps, order of steps, and the like shown in the following embodiments are merely examples, and are not intended to limit the present disclosure. Among components in the following embodiments, a component that is not described in an independent claim indicating the most significant concept will be described as an arbitrary component. All the embodiments have respective contents that can be combined.

In the following, embodiments of the present disclosure will be described in detail with reference to the drawings. Note that elements denoted by the same reference numerals in different drawings represent the same or corresponding elements.

First Embodiment

FIG. 1 is a block diagram illustrating a configuration of an information processing system 1 according to a first embodiment of the present disclosure. In an example of the present embodiment, the information processing system 1 is constructed as a management system of a home delivery agent that delivers a parcel to a customer's home or the like by an electric vehicle (EV). As an example, the home delivery agent owns a plurality of business establishments each in charge of each delivery area and a head office that controls the plurality of business establishments. A local PC12 is installed in the head office and each business establishment, and is connected to a cloud server 11. In addition, a plurality of vehicles 13 for parcel delivery is arranged in each business establishment. The cloud server 11, the local PC12, and the vehicle 13 are communicable with each other via an arbitrary communication network 14 such as an IP network. Although in the present embodiment, the movable body is a vehicle, the present disclosure is not limited thereto. For example, the movable body may be an aircraft such as a drone, a ship, or a mobile robot.

The cloud server 11 includes a data processing unit 22, a storage unit 23, and a communication unit 24. The local PC12 includes a display unit 31, a data processing unit 32, a storage unit 33, a communication unit 34, and an input unit 35. The display unit 31 is a liquid crystal display, an organic EL display, or the like. The data processing units 22 and 32 are processors such as CPUs. The storage units 23 and 33 are HDDs, SSDs, or the like. The communication units 24 and 34 are communication modules that perform data communication according to a predetermined communication standard such as IP. The input unit 35 is a mouse, a keyboard, or the like.

The vehicle 13 is an EV truck or the like, and includes a battery 41, a control unit 42, and a communication unit 43. The battery 41 is a secondary battery such as a lithium ion battery for driving a traveling motor mounted on the vehicle 13. The control unit 42 is a battery management system (BMS) for performing operation control and state management of the battery 41. The communication unit 43 is a communication module that performs data communication according to a predetermined communication standard such as IP.

Note that an application target of the information processing system 1 according to the present embodiment is not limited to home delivery business, and is any business such as taxi business, car rental business, car sharing business, or chauffeur service that conducts business using a plurality of EVs.

Figure 2:
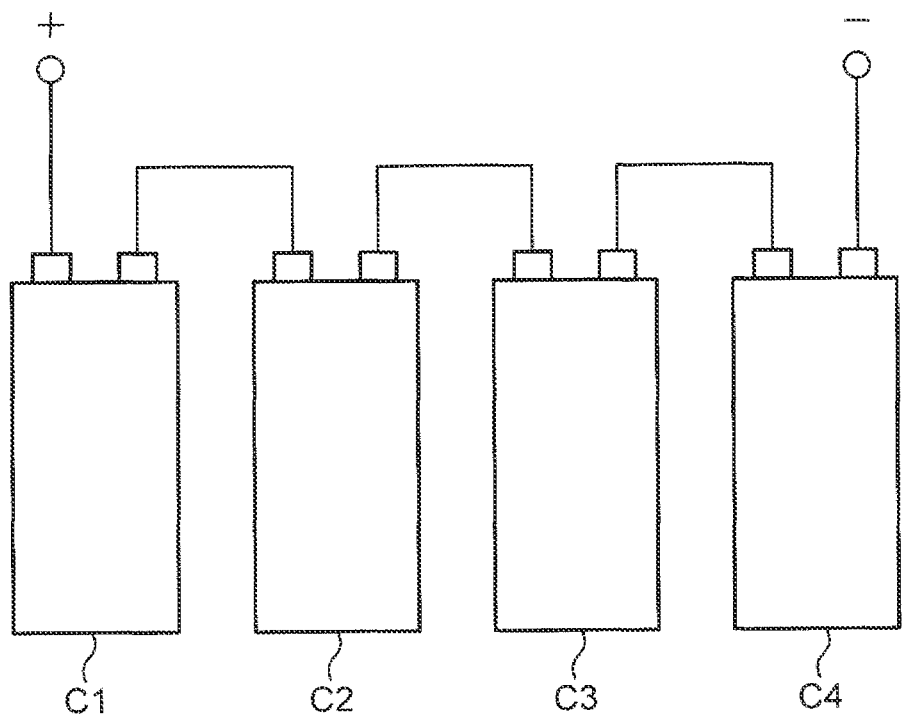
FIG. 2 is a view illustrating a simplified configuration of a battery.

FIG. 2 is a diagram illustrating a simplified configuration of the battery 41. The battery 41 includes a plurality of cells (battery cells) C1 to C4 connected in series. In other words, the battery 41 is configured as a battery pack including the plurality of cells C1 to C4 connected in series. Note that the number of cells is not limited to four, and may be any plurality of cells.

Figure 3:
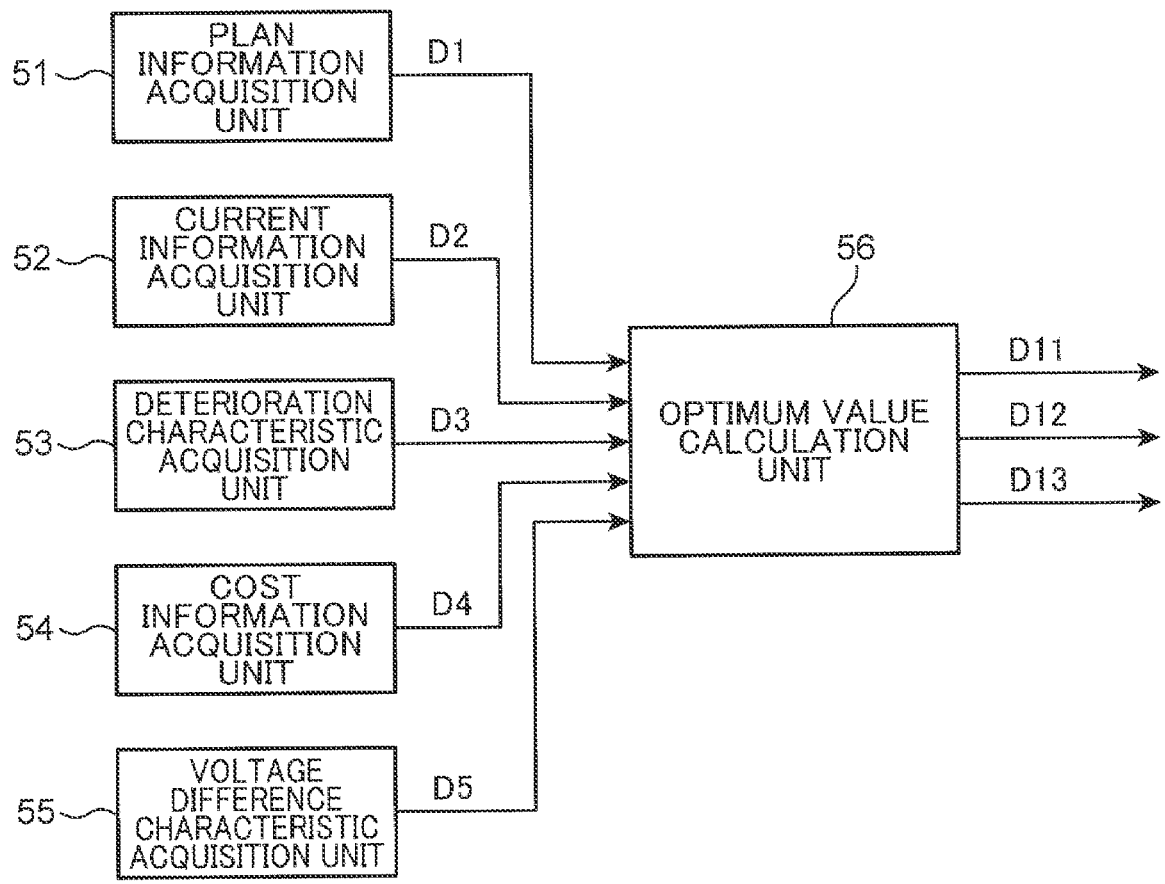
FIG. 3 is a block diagram illustrating a function of a data processing unit.

FIG. 3 is a block diagram illustrating functions of the data processing unit 22 of the cloud server 11. As illustrated in FIG. 3, the data processing unit 22 includes a plan information acquisition unit 51, a current information acquisition unit 52, a deterioration characteristic acquisition unit 53, a cost information acquisition unit 54, a voltage difference characteristic acquisition unit 55, and an optimum value calculation unit 56. These functions may be realized in a software manner by execution, by a CPU, of a program read from a ROM or the like.

Figure 4:
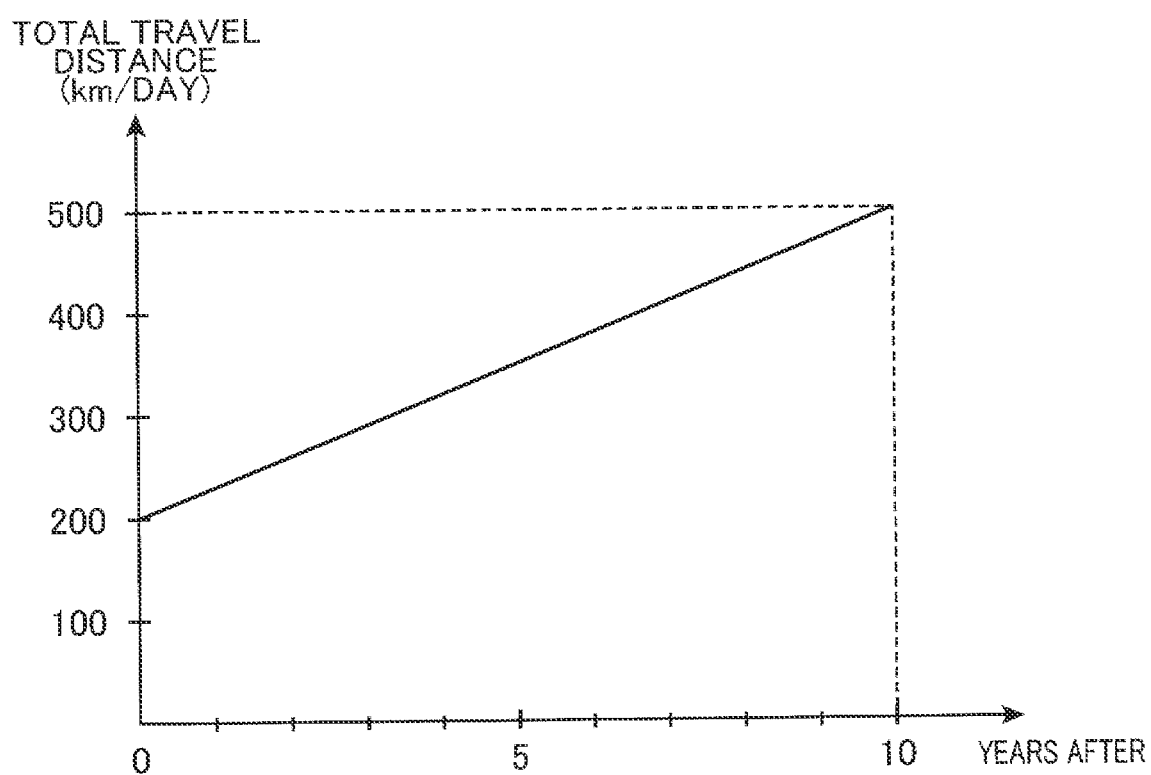
FIG. 4 is a diagram illustrating an example of a long-term business plan of a certain business establishment.

FIG. 4 is a diagram illustrating an example of a long-term business plan of a certain business establishment, FIG. 5 is a diagram illustrating an example of a current business situation at the business establishment, and FIG. 6 is a diagram illustrating an example of business costs at the business establishment.

At present (after zero year), this business establishment is in charge of a predetermined delivery area using four EVs (vehicles A to D). A total travel distance of the four EVs per day is 200 km. In this business establishment, expansion of a business scale is planned with an increase in an amount of parcels, and as shown in FIG. 4, it is planned to increase the total travel distance per day to 500 km after 10 years. Plan information indicating the long-term business plan is input from the input unit 35 of the local PC12 installed in the business establishment. The plan information is input to the local PC12 when a new long-term business plan is formulated and when an existing long-term business plan is changed due to occurrence of a special event such as disaster. The input plan information is transmitted from the local PC12 to the cloud server 11 via the communication network 14 and stored in the storage unit 23. With reference to FIG. 3, the plan information acquisition unit 51 acquires the plan information received from the local PC12.

As illustrated in FIG. 5, the current business situation includes date of purchase, a total travel distance from the time of a new car to the present, a current SoH, a current set value of a travel distance per day, a maximum cell voltage, and a minimum cell voltage for each of the four EVs. The SoH is an index indicating a deterioration degree of the battery 41. The maximum cell voltage is a maximum value of cell voltages of the cells C1 to C4. The minimum cell voltage is a minimum value of the cell voltages of the cells C1 to C4. Current information indicating a current business situation is input from the input unit 35 of the local PC12 installed in the business establishment. The current information is input to the local PC12 when a new long-term business plan is formulated, when an existing long-term business plan is changed, and periodically (e.g., once every half year). The input current information is transmitted from the local PC12 to the cloud server 11 via the communication network 14 and stored in the storage unit 23. In a case of starting up a new business establishment using only a new EV car, since the battery 41 is not deteriorated in any vehicle 13, transmission of current information to the cloud server 11 may be omitted. With reference to FIG. 3, current information acquisition unit 52 acquires the current information received from the local PC12. Information about the maximum cell voltage and the minimum cell voltage may be transmitted not from the local PC12 but from the vehicle 13 to the cloud server 11 via the communication network 14.

As illustrated in FIG. 6, business costs at the business establishment are classified into a cost (vehicle number-linked cost) that varies with the number of vehicles 13 arranged in the business establishment, a cost (deterioration-linked cost) that varies with a deterioration degree of the battery 41, and a cost (fixed cost) that does not vary with the number of vehicles and the deterioration degree of the battery. The vehicle number-linked cost includes a labor cost of a driver, and a vehicle maintenance cost such as a maintenance cost and an insurance premium. Although not illustrated in FIG. 6, the vehicle number-linked cost includes an electric bill of the vehicle 13, a lease cost when the vehicle 13 is leased, and the like. The deterioration-linked cost includes a vehicle purchase cost (first cost) of the vehicle 13 and a voltage adjustment work cost (second cost). In a case where an old vehicle is sold at the time of purchase of a new vehicle, a profit from the sale is counted as a negative vehicle purchase cost.

When an EV is used for a long time, there arises a difference in remaining capacity between the plurality of cells C1 to C4 to have a state of unbalancing of a cell voltage (cell imbalance). In the battery 41 in which cell imbalance occurs, cells having a remaining capacity of 100% and cells having a remaining capacity of less than 100% are mixed at the time of completion of charging. When discharging of the battery 41 is started by actuation of the EV, the discharging will be stopped when the remaining capacity of the latter cell reaches an allowable lower limit value. As a result, the battery capacity of the battery 41 as a whole is substantially reduced. In the present embodiment, in order to avoid an increase in the cost of the EV, instead of mounting the above-described cell balancing circuit in the battery pack, a method is adopted in which an EV in which cell imbalance occurs is transported to a repair shop or the like to perform voltage adjustment work of the battery 41. In this voltage adjustment work, similarly to the cell balancing circuit, the cell imbalance of the battery 41 is eliminated by forcibly discharging a cell with a large remaining capacity to equalize cell voltages of all the cells. The voltage adjustment work cost illustrated in FIG. 6 is a cost required for the voltage adjustment work in the repair shop or the like.

Although not illustrated in FIG. 6, the deterioration-linked cost includes a vehicle scrapping cost for scrapping the vehicle 13 that has come to the end of its life. The fixed cost includes operating costs such as rent, a warehouse cost, and a labor cost excluding the driver. The cost information of the business establishment indicates a cost unit price corresponding to each cost item such as the driver labor cost and the vehicle maintenance cost.

The cost information of the business establishment is input from the input unit 35 of the local PC12 installed in the business establishment. The cost information is input to the local PC12 when a new long-term business plan is formulated, when an existing long-term business plan is changed, and periodically (e.g., once every half year). The input cost information is transmitted from the local PC12 to the cloud server 11 via the communication network 14 and stored in the storage unit 23. With reference to FIG. 3, the cost information acquisition unit 54 acquires the cost information received from the local PC12.

Figure 7:
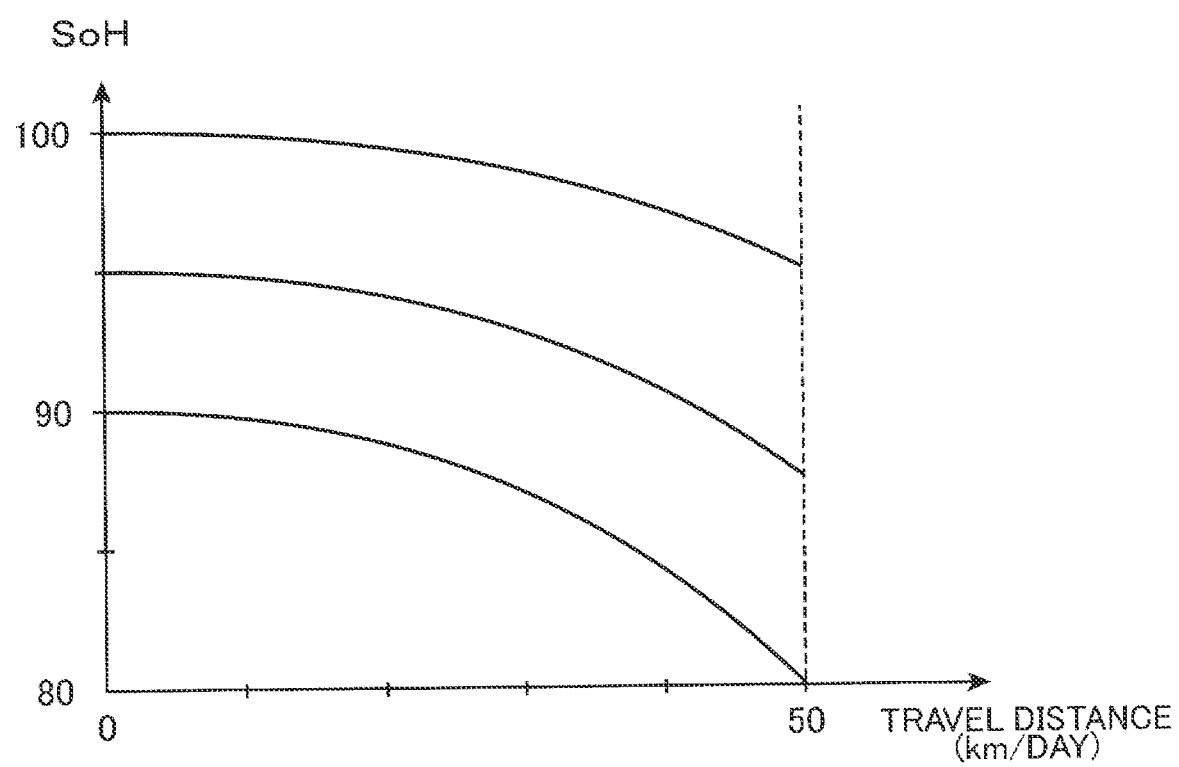
FIG. 7 is a diagram illustrating an example of a deterioration characteristic indicating a deterioration degree of a battery with respect to a travel distance of a vehicle.

FIG. 7 is a diagram illustrating an example of a deterioration characteristic indicating the deterioration degree of the battery 41 with respect to a travel distance of the vehicle 13. The horizontal axis of the graph represents a travel distance (km/day) per day. The vertical axis of the graph represents a value (%) of SoH after one year in a case where the travel distance indicated by the horizontal axis is continued for one year. The value on the vertical axis when the horizontal axis is 0 is the current SoH of the battery 41. For example, if the battery 41 having the current SoH of 90% is continuously used at a travel distance of 50 km per day, the SoH of that battery 41 drops to 80% after one year. When the SoH of the battery 41 decreases to less than a predetermined value (e.g., 80%) (in other words, when the deterioration degree of the battery 41 becomes equal to or higher than a threshold value), the battery 41 or the vehicle 13 on which the battery 41 is mounted has reached the end of its life (i.e., the remaining lifetime is zero).

Although FIG. 7 illustrates deterioration characteristics of only three patterns with the current SoH of 90, 95, and 100%, a large number of deterioration characteristics may be prepared with finer increments (e.g., increment of 1%). In addition, the deterioration characteristic may be indicated in a form such as a function formula or a lookup table instead of the form of such a graph as illustrated in FIG. 7. With reference to FIG. 3, the deterioration characteristic acquisition unit 53 acquires the deterioration characteristic of the battery 41 by reading a deterioration characteristic prepared in advance for each type of the battery from the storage unit 23. Note that the deterioration characteristic acquisition unit 53 may acquire the deterioration characteristic of the battery 41 by acquiring information on the deterioration characteristics from a manufacturer of the battery 41, an analysis manufacturer, or the like. In a case where no deterioration characteristic of the battery 41 is prepared in advance and is available from a manufacturer or the like, the deterioration characteristic acquisition unit 53 acquires the deterioration characteristic of the battery 41 by preparing the deterioration characteristic by itself by analyzing vehicle information (including charge/discharge information of the battery 41) acquired from a large number of vehicles 13.

Figure 8:
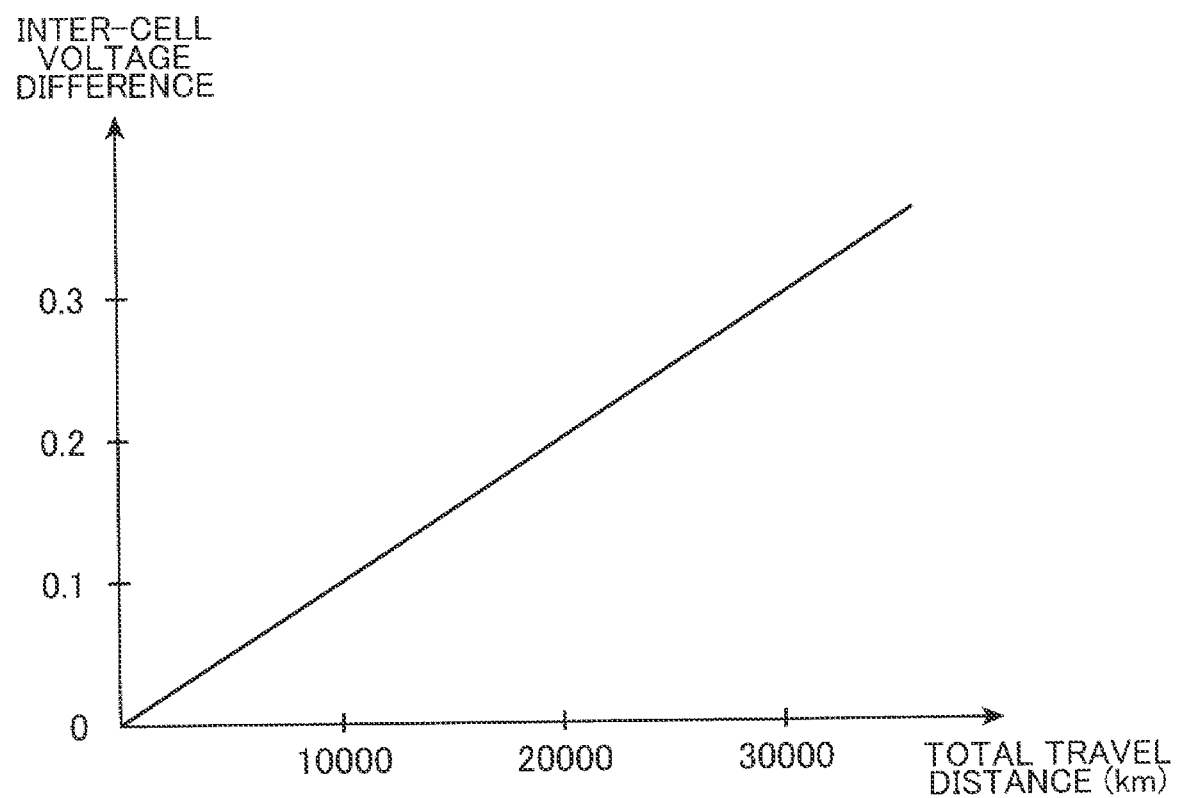
FIG. 8 is a diagram illustrating an example of a voltage difference characteristic indicating an inter-cell voltage difference of the battery with respect to a total travel distance of the vehicle.

FIG. 8 is a diagram illustrating an example of a voltage difference characteristic indicating an inter-cell voltage difference of the battery 41 with respect to a total travel distance of the vehicle 13. The horizontal axis of the graph indicates the total travel distance (km) of the vehicle 13 from the time of a new car. The total travel distance of the vehicle 13 corresponds to a total charge/discharge amount of the battery 41. A charge/discharge amount includes at least one of a charge amount and a discharge amount. The vertical axis of the graph represents the inter-cell voltage difference which is a difference between the maximum cell voltage and the minimum cell voltage among all the cells C1 to C4. It can be seen that the inter-cell voltage difference increases substantially in proportion to the total travel distance. The inter-cell voltage difference is substantially proportional to not only the total travel distance of the vehicle 13 but also an elapsed time from the time of manufacturing the battery 41. Accordingly, the horizontal axis of the graph may indicate an elapsed time instead of the total travel distance.

Note that the voltage difference characteristic may be indicated in such a form as a function formula or a lookup table instead of the form of such a graph as illustrated in FIG. 8. With reference to FIG. 3, the voltage difference characteristic acquisition unit 55 acquires the voltage difference characteristic of the battery 41 by reading a voltage difference characteristic prepared in advance for each type of battery from the storage unit 23. Note that the voltage difference characteristic acquisition unit 55 may acquire the voltage difference characteristic of the battery 41 by acquiring information on the voltage difference characteristic from a manufacturer of the battery 41, an analysis manufacturer, or the like. In a case where no voltage difference characteristic of the battery 41 is prepared in advance and is available from a manufacturer or the like, the voltage difference characteristic acquisition unit 55 acquires the voltage difference characteristic of the battery 41 by preparing the voltage difference characteristic by itself by analyzing the vehicle information (including the charge/discharge information of the battery 41) acquired from a large number of vehicles 13.

On the basis of the information illustrated in FIGS. 4 to 8, the cloud server 11 determines an optimum number of vehicles 13 (a planned number of vehicles) to be arranged in each business establishment, an optimum travel distance of each vehicle 13 (planned travel distance), and optimum execution timing (work timing) for the voltage adjustment work of each vehicle 13 so that the total cost of ownership (TCO) in a long term (e.g., ten years) at each business establishment is minimized Furthermore, at the same time, timing (planned timing) of purchase, sale, or scrapping of the vehicle 13 or the battery 41 mounted on the vehicle 13 may be determined.

Figure 9:
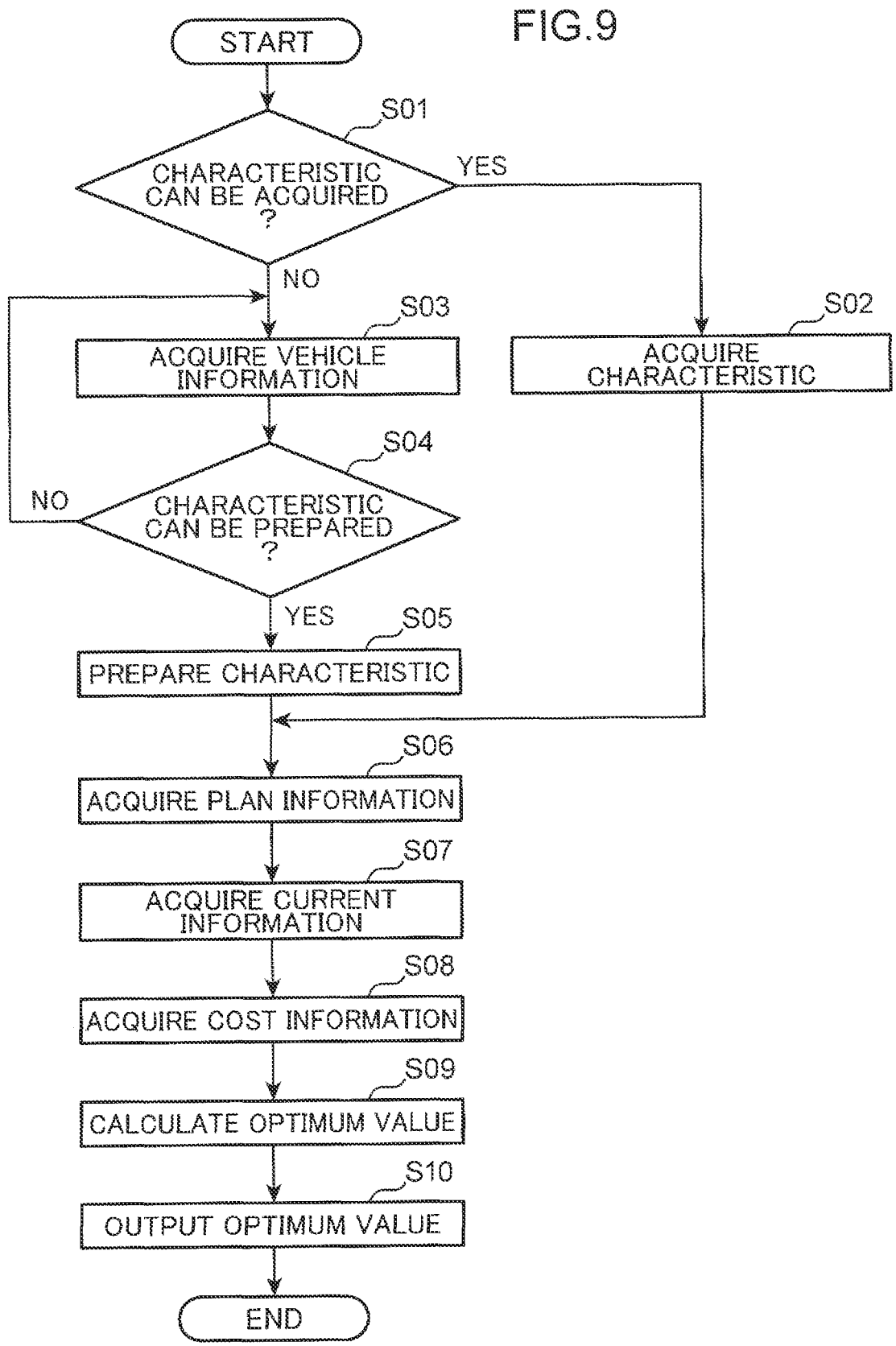
FIG. 9 is a flowchart illustrating a flow of processing executed by the data processing unit.

FIG. 9 is a flowchart illustrating a flow of processing executed by the data processing unit 22 of the cloud server 11 to determine a planned number of vehicles in a target business establishment, a planned travel distance, and work timing.

When a request for determining a planned number of vehicles, the planned travel distance, and the work timing for a certain business establishment is input to the cloud server 11, first, in Step S01, the deterioration characteristic acquisition unit 53 and the voltage difference characteristic acquisition unit 55 determine whether or not the deterioration characteristics illustrated in FIG. 7 and the voltage difference characteristics illustrated in FIG. 8 can be acquired, respectively. When the deterioration characteristic and the voltage difference characteristic prepared in advance are stored in the storage unit 23, or when information on the deterioration characteristic and the voltage difference characteristic is available from a manufacturer of the battery 41 or the like, the deterioration characteristic acquisition unit 53 and the voltage difference characteristic acquisition unit 55 determine that the deterioration characteristic and the voltage difference characteristic can be acquired.

When the deterioration characteristic and the voltage difference characteristic can be acquired (Step S01: YES), next in Step S02, the deterioration characteristic acquisition unit 53 and the voltage difference characteristic acquisition unit 55 acquire the deterioration characteristic and the voltage difference characteristic of the battery 41 by reading the deterioration characteristic and the voltage difference characteristic from the storage unit 23 or by accessing a database of a manufacturer of the battery 41 or the like and downloading the information on the deterioration characteristic and the voltage difference characteristic. The deterioration characteristic acquisition unit 53 and the voltage difference characteristic acquisition unit 55 input the acquired deterioration characteristic and voltage difference characteristic to the optimum value calculation unit 56 as data D3 and D5.

In a case where the deterioration characteristic or the voltage difference characteristic cannot be acquired (Step S01: NO), the cloud server 11 then acquires the vehicle information from a large number of vehicles 13 via the communication network 14 in Step S03. The vehicle information includes the charge/discharge information of the battery 41 of each vehicle 13. The vehicle information also includes travel distance information of each vehicle 13. The acquired vehicle information is accumulated in the storage unit 23.

Next, in Step S04, the deterioration characteristic acquisition unit 53 or the voltage difference characteristic acquisition unit 55 determines whether or not a sufficient amount of the vehicle information for preparing the deterioration characteristic or the voltage difference characteristic has been accumulated in the storage unit 23. In a case where a sufficient amount of the vehicle information is not accumulated (Step S04: NO), the processing of Steps S03 and S04 is repeatedly executed until a sufficient amount of the vehicle information is accumulated.

When a sufficient amount of the vehicle information has been accumulated (Step S04: YES), the deterioration characteristic acquisition unit 53 or the voltage difference characteristic acquisition unit 55 next prepares a deterioration characteristic or a voltage difference characteristic of the battery 41 on the basis of the vehicle information accumulated in the storage unit 23 in Step S05. The vehicle information includes the charge/discharge information (including information on the maximum cell voltage and the minimum cell voltage) of the battery 41 and the travel distance information on each vehicle 13. Accordingly, by analyzing these pieces of information, the deterioration characteristic acquisition unit 53 can prepare the deterioration characteristic indicating the relationship between the travel distance of the vehicle 13 and the deterioration degree (SoH) of the battery 41 for each type of the battery 41. In addition, by analyzing these pieces of information, the voltage difference characteristic acquisition unit 55 can prepare the voltage difference characteristic indicating the relationship between the travel distance of the vehicle 13 and an inter-cell voltage difference of the battery 41 for each type of the battery 41. The deterioration characteristic acquisition unit 53 or the voltage difference characteristic acquisition unit 55 inputs the prepared deterioration characteristic or voltage difference characteristic to the optimum value calculation unit 56 as the data D3 and D5.

Subsequently to Step S02 or Step S05, in Step S06, the plan information acquisition unit 51 reads the plan information received from the local PC12 and stored in the storage unit 23 from the storage unit 23, thereby acquiring plan information indicating a long-term business plan of the target business establishment. As illustrated in FIG. 4, the plan information indicates a total travel distance (km/day) per day by a plurality of vehicles 13 arranged at the business establishment on a one year basis. The plan information acquisition unit 51 inputs the acquired plan information to the optimum value calculation unit 56 as data D1.

Next, in Step S07, the current information acquisition unit 52 reads the current information received from the local PC12 and stored in the storage unit 23 from the storage unit 23, thereby acquiring the current information (see FIG. 5) indicating the current business situation of the target business establishment. The current information acquisition unit 52 inputs the acquired current information to the optimum value calculation unit 56 as data D2.

Next, in Step S08, the cost information acquisition unit 54 reads the cost information received from the local PC12 and stored in the storage unit 23 from the storage unit 23, thereby acquiring the cost information of the target business establishment. As illustrated in FIG. 6, the cost information includes the items of the vehicle number-linked costs that vary with the number of vehicles 13 and a unit price for calculating each item, the items of the deterioration-linked costs that vary with the deterioration degree of the battery 41 and a unit price for calculating each item, and the item of the fixed cost and a unit price for calculating the item. The cost information acquisition unit 54 inputs the acquired cost information to the optimum value calculation unit 56 as data D4.

Next, in Step S09, the optimum value calculation unit 56 determines the planned number of the vehicles 13, the planned travel distance of each vehicle 13, and the work timing of each vehicle 13 for the target business establishment on the basis of the plan information indicated by the data D1, the current information indicated by the data D2, the deterioration characteristic indicated by the data D3, the cost information indicated by the data D4, and the voltage difference characteristic indicated by the data D5.

A prediction model for predicting objective variables (a planned number of vehicles, a planned travel distance, work timing) from explanatory variables (deterioration characteristic, voltage difference characteristic, plan information, current information, cost information) can be derived by machine learning using artificial intelligence. As an algorithm of the prediction model, path optimization by linear programming, a neural network, multiple regression analysis, or the like can be used. A combination of the number of vehicles and the travel distance of each vehicle for realizing the total travel distance in each year specified in the plan information and a combination of the vehicle purchase and the voltage adjustment work are variously changed to search for a combination in which the TCO satisfies a predetermined requirement. As the predetermined requirement, for example, one combination in which the TCO is minimized or one or more combinations in which the TCO is less than a target value are searched for. The optimum value calculation unit 56 outputs the determined planned number of vehicles as data D11, outputs the determined planned travel distance as data D12, and outputs the determined work timing as data D13.

Next, in Step S10, the cloud server 11 transmits the data D11 to D13 to the local PC12 of the head office or the target business establishment via the communication network 14. The display unit 31 of the local PC12 displays (presents) the planned number of vehicles, the planned travel distance, and the work timing regarding its own business establishment on the basis of the received data D11 to D13.

Figure 10:
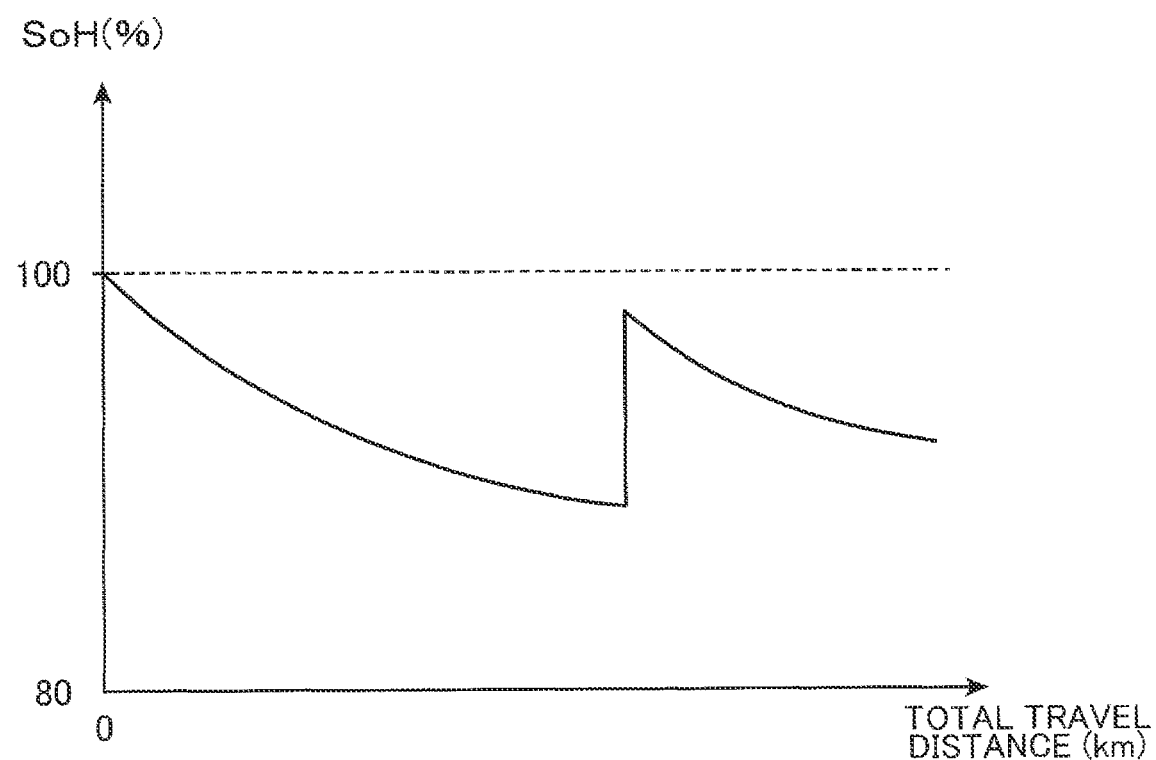
FIG. 10 is a diagram illustrating an example of a deterioration degree of the battery with respect to the total travel distance of the vehicle.

FIG. 10 is a diagram illustrating an example of a deterioration degree of the battery 41 with respect to the total travel distance of the vehicle 13. In FIG. 10, the deterioration of the battery 41 proceeds as the total travel distance of the vehicle 13 increases. However, when the voltage adjustment work is performed at the work timing calculated as described above, the deterioration degree of the battery 41 is recovered. By determining such voltage adjustment work on the basis of the sum of the first cost and the second cost, it is possible to continue to use the battery 41 while suppressing the cost. The horizontal axis in FIG. 10 may be elapsed time or date instead of the total travel distance.

Figure 11:
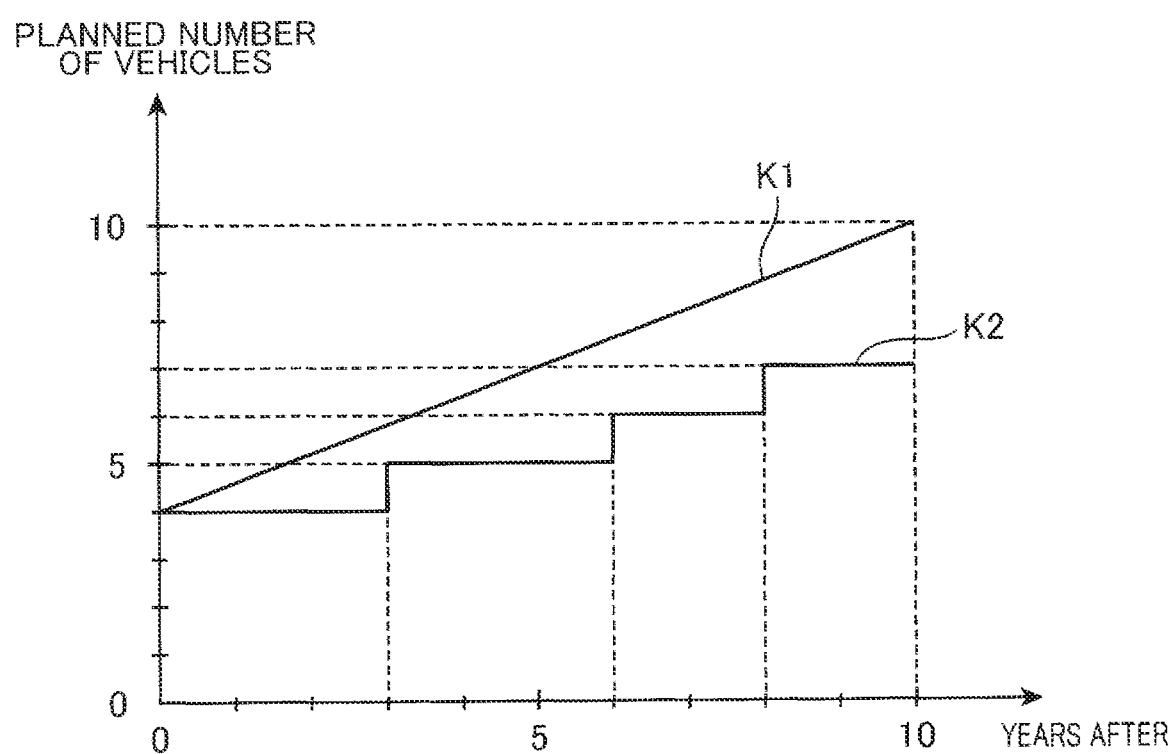
FIG. 11 is a diagram illustrating an example of a presented planned number of vehicles in a simplified manner.
Figure 12:
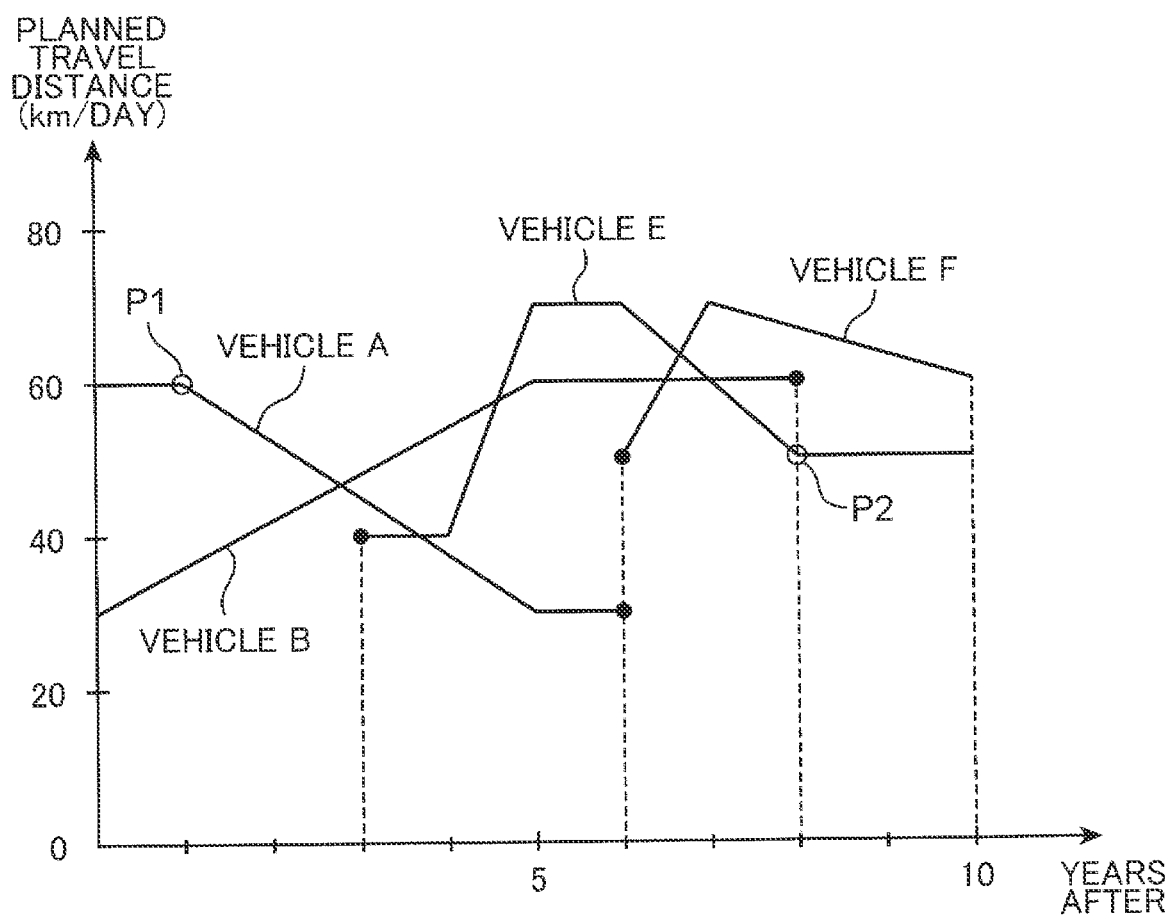
FIG. 12 is a diagram illustrating an example of a presented planned travel distance in a simplified manner.

FIG. 11 is a diagram illustrating an example of a presented planned number of vehicles in a simplified manner, and FIG. 12 is a diagram illustrating an example of the presented planned travel distance and planned timing in a simplified manner. In FIG. 11, a characteristic K1 indicates a graph in a case where the number of vehicles 13 is simply increased in accordance with an increase in the total travel distance. The number of vehicles 13 after ten years is ten. A characteristic K2 indicates a progression of the planned number of vehicles determined by the optimum value calculation unit 56. The number of the vehicles 13 increases one by one after three years, six years, and eight years, and the number of the vehicles 13 after ten years is seven.

With reference to FIG. 12, it can be seen that the planned travel distance greatly increases or decreases every year even regarding the same vehicle 13 (e.g., a vehicle E). In addition, for example, the graph regarding the vehicle A disappears after six years. This indicates that the optimum time for selling (or scrapping) the vehicle A is after six years. Further, a graph regarding the vehicle E appears after three years. This indicates that the optimum timing for purchasing the vehicle E is three years later. A point P1 is set for the vehicle A after one year, and a point P2 is set for the vehicle E after eight years. The points P1 and P2 correspond to the timing for performing the voltage adjustment work of the battery 41. In other words, it is indicated that the optimum timing for performing the voltage adjustment work on the vehicle A is one year later, and the optimum timing for performing the voltage adjustment work on the vehicle E is eight years later.

On the basis of the data D13, the data processing unit 22 may cause the display unit 31 to display information that presents the target vehicle and the execution timing of the voltage adjustment work a predetermined period (e.g., one to several months) before arrival of the execution timing of the voltage adjustment work of each of the vehicles A and E.

In a case of the vehicle 13 whose battery 41 is replaceable, replacement timing of the battery 41 may be presented. For example, when the battery 41 of the vehicle A is replaced six years later, a graph of a vehicle F is taken over by the vehicle A whose battery has been replaced.

According to the present embodiment, the data processing unit 22 of the cloud server 11 (the information processing device) acquires the long-term plan information (the charge/discharge information or movement information) of the business establishment, the deterioration characteristic (first relationship information) of the battery 41, the voltage difference characteristic (second relationship information) of the battery 41, and the cost information including a unit price (first cost information) of the vehicle purchase cost (the first cost) and a unit price (second cost information) of the voltage adjustment work cost (the second cost). Then, on the basis of the acquired these pieces of information, work timing for performing the work for reducing the voltage difference generated between the plurality of cells C1 to C4 of the battery 41 is determined so that the sum of the first cost and the second cost satisfies a predetermined requirement. As described above, by determining the work timing on the basis of a sum of the vehicle purchase cost and the voltage adjustment work cost, the work timing can be determined to be appropriate timing from a viewpoint of the cost of the battery 41. For example, it is possible to determine optimum work timing at which a long-term total cost TCO is minimized.

Furthermore, according to the present embodiment, the data processing unit 22 of the cloud server 11 determines planned timing regarding purchase, sale, or scrapping of the vehicle 13 or the battery 41 so that the sum of the vehicle purchase cost and the voltage adjustment work cost satisfies the predetermined requirement. As described above, by determining the planned timing on the basis of the total of the vehicle purchase cost and the voltage adjustment work cost, it is possible to determine optimum planned timing of the vehicle 13 or the battery 41 with the minimum long-term total cost TCO.

In addition, according to the present embodiment, by including, in the first cost, the cost required for purchasing, selling, or scrapping the battery 41 whose deterioration degree is equal to or higher than the threshold or the vehicle 13 equipped with the battery 41, an end of life of the battery 41 or the vehicle 13 can be controlled using the threshold. Therefore, accuracy of the first cost, which is a deterioration-linked cost, can be increased.

In addition, according to the present embodiment, by causing the display unit 31 and the like to present the information such as the execution timing a predetermined period before arrival of the execution timing of the voltage adjustment work of the battery 41, a manager and the like is allowed to arrange work reservation and the like without delay.

Second Embodiment

Although in the above-described first embodiment, with a battery-driven EV as an example of an electric apparatus, the cloud server 11 determines the execution timing of the voltage adjustment work of a battery on the basis of travel plan information of the EV, the present invention is not limited to this example. For any electric apparatus driven by a battery having a plurality of cells, the cloud server 11 may determine the execution timing of the voltage adjustment work of the battery on the basis of use plan information of the electric apparatus. The electric apparatus is, for example, an electric storage device. The electric storage device may have a power generating function. The use plan information of the electric apparatus can be formulated as charge/discharge information indicating a charge/discharge amount (at least one of a charge amount and a discharge amount) of the battery. In a case where plan information on charge/discharge is unknown, the plan information acquisition unit 51 may estimate the plan information, on the basis of history information indicating past use conditions of the electric apparatus or the battery, from a tendency of the use conditions.

Figure 13:
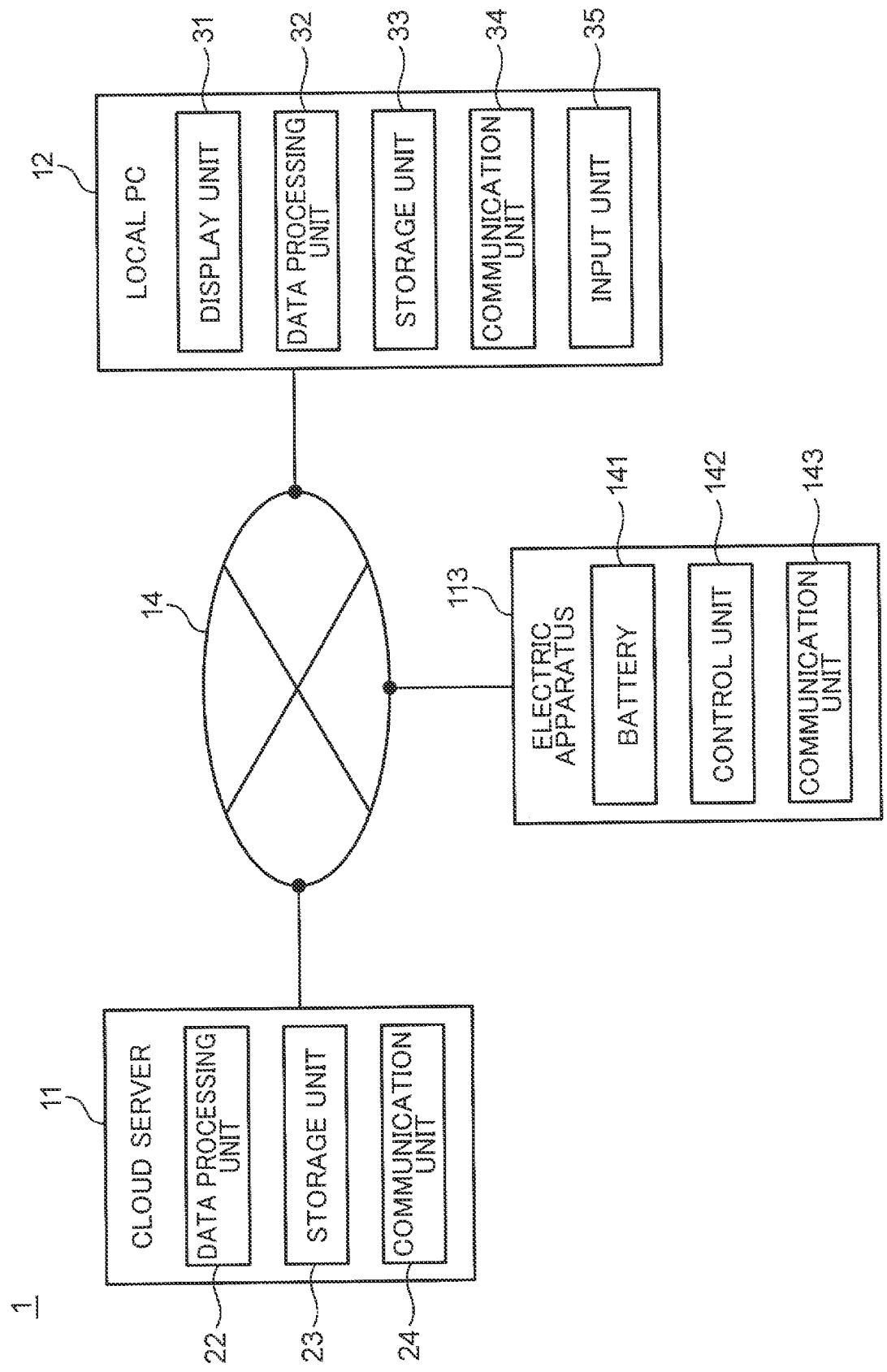
FIG. 13 is a block diagram illustrating a configuration of an information processing system according to a second embodiment of the present disclosure.

FIG. 13 is a block diagram illustrating a configuration of an information processing system 1 according to a second embodiment of the present disclosure. The vehicle 13 illustrated in FIG. 1 is replaced with an electric apparatus 113. The electric apparatus 113 includes a battery 141, a control unit 142, and a communication unit 143. The battery 141, the control unit 142, and the communication unit 143 correspond to the battery 41, the control unit 42, and the communication unit 43 illustrated in FIG. 1, respectively.

In the present embodiment, the cloud server 11 determines the optimum number (the planned number) of the electric apparatuses 113, an optimum charge/discharge amount (planned charge/discharge amount) of each electric apparatus 113, and optimum execution timing (work timing) for voltage adjustment work of each electric apparatus 113 so as to minimize a total cost TCO in a long term (e.g., ten years).

FIG. 14 is a flowchart illustrating a flow of processing executed by the data processing unit 22 of the cloud server 11 to determine a planned number of electric apparatuses, a planned charge/discharge amount, and work timing.

When a request for determining a planned number of electric apparatuses, a planned charge/discharge amount, and work timing is input to the cloud server 11, first, in Step S01, the deterioration characteristic acquisition unit 53 and the voltage difference characteristic acquisition unit 55 determine whether or not a deterioration characteristic and a voltage difference characteristic can be acquired, respectively.

When the deterioration characteristic and the voltage difference characteristic can be acquired (Step S01: YES), next, in Step S02, the deterioration characteristic acquisition unit 53 and the voltage difference characteristic acquisition unit 55 acquire the deterioration characteristic and the voltage difference characteristic of the battery 41, and input the acquired deterioration characteristic and voltage difference characteristic to the optimum value calculation unit 56 as the data D3 and the D5, respectively.

In a case where the deterioration characteristic or the voltage difference characteristic cannot be acquired (Step S01: NO), the cloud server 11 then acquires log information from a large number of electric apparatuses 113 via the communication network 14 in Step S103. The long information includes the charge/discharge information of the battery 41 of each electric apparatus 113. The acquired log information is accumulated in the storage unit 23.

Next, in Step S04, the deterioration characteristic acquisition unit 53 or the voltage difference characteristic acquisition unit 55 determines whether or not a sufficient amount of log information for preparing the deterioration characteristic or the voltage difference characteristic has been accumulated in the storage unit 23. In a case where a sufficient amount of the log information is not accumulated (Step S04: NO), the processing of Steps S03 and S04 are repeatedly executed until a sufficient amount of the log information is accumulated.

When a sufficient amount of the log information has been accumulated (Step S04: YES), the deterioration characteristic acquisition unit 53 or the voltage difference characteristic acquisition unit 55 next prepares a deterioration characteristic or a voltage difference characteristic of the battery 41 on the basis of the log information accumulated in the storage unit 23 in Step S05. The log information includes charge/discharge information (including information on a maximum cell voltage and a minimum cell voltage) of the battery 41 regarding each electric apparatus 113. Accordingly, by analyzing these pieces of information, the deterioration characteristic acquisition unit 53 can prepare a deterioration characteristic indicating a relationship between a total use time of the electric apparatus 113 (or a total charge/discharge amount of the battery 41) and a deterioration degree (SoH) of the battery 41 for each type of the battery 41. In addition, by analyzing these pieces of information, the voltage difference characteristic acquisition unit 55 can prepare a voltage difference characteristic indicating a relationship between the total use time of the electric apparatus 113 (or the total charge/discharge amount of the battery 41) and an inter-cell voltage difference of the battery 41 for each type of the battery 41. The deterioration characteristic acquisition unit 53 or the voltage difference characteristic acquisition unit 55 inputs the prepared deterioration characteristic or voltage difference characteristic to the optimum value calculation unit 56 as the data D3 and D5.

Hereafter, similarly to the first embodiment, the data processing unit 22 sequentially executes the processing of Steps S06 to S10 to determine the optimum number (planned number) of the electric apparatuses 113, an optimum charge/discharge amount (planned charge/discharge amount) of each electric apparatus 113, and optimum execution timing (work timing) of the voltage adjustment work of each electric apparatus 113 so as to minimize the total cost TCO, and to cause these pieces of information to be presented.

According to the present embodiment, the data processing unit 22 of the cloud server 11 (the information processing device) acquires the use plan information of the electric apparatus 113 (the charge/discharge information of the battery 41), the deterioration characteristic of the battery 41 (first relationship information), the voltage difference characteristic of the battery 41 (second relationship information), and cost information including a unit price (first cost information) of a purchase cost of the electric apparatus 113 (first cost) and a unit price (second cost information) of a voltage adjustment work cost (second cost). Then, on the basis of the acquired these pieces of information, work timing for performing the work for reducing the voltage difference generated between the plurality of cells C1 to C4 of the battery 41 is determined so that the sum of the first cost and the second cost satisfies a predetermined requirement. As described above, by determining the work timing on the basis of a sum of the apparatus purchase cost and the voltage adjustment work cost, the work timing can be determined to be appropriate timing from a viewpoint of the cost of the battery 41. For example, it is possible to determine optimum work timing at which a long-term total cost TCO is minimized According to the present embodiment, the charge/discharge information of the battery 41 is plan information or history information of charge/discharge of the battery 41. By using the plan information, the work timing can be determined before the start of use of the electric apparatus. In addition, by using the past history information, it is possible to determine the work timing in consideration of use conditions of the electric apparatus during its use.

INDUSTRIAL APPLICABILITY

The technique according to the present disclosure is particularly useful for formulating a long-term business plan in home delivery business or the like using a plurality of EVs.

The invention claimed is:

1. An information processing method comprising, by an information processing device:
   acquiring at least one of (1) charge information indicating information corresponding to a charge amount per unit period of a battery provided in an electric apparatus driven by the battery or (2) discharge information indicating information corresponding to a discharge amount per unit period of the battery provided in the electric apparatus driven by the battery, the battery having a plurality of cells;
   acquiring first relationship information indicating a relationship between the information corresponding to at least one of the charge amount per the unit period or the discharge amount per the unit period and a deterioration degree of the battery;
   acquiring second relationship information indicating a relationship between an elapsed time or at least one of the charge amount or the discharge amount, and a voltage difference generated between the plurality of cells;
   acquiring current information including information indicating a current deterioration degree of the battery and information indicating a current voltage difference generated between the plurality of cells;
   acquiring first cost information indicating a first cost generated by deterioration of the battery and second cost information indicating a second cost required for work for reducing the voltage difference;
   determining, on the basis of at least one of the charge information or the discharge information, the first relationship information, the second relationship information, the first cost information, and the second cost information, work timing at which the work in at least one of a charge plan or a discharge plan is performed, and the current information, the work timing being timing at which a sum of the first cost and the second cost satisfies a predetermined requirement; and
   causing a presentation device to present information indicating the work timing.

2. The information processing method according to claim 1, wherein the charge information is plan information or history information regarding charge, and the discharge information is plan information or history information regarding discharge.

3. The information processing method according to claim 1, wherein
   the electric apparatus is a movable body,
   the information corresponding to at least one of the charge amount or the discharge amount is a moving distance of the movable body,
   at least one of the charge information or the discharge information is movement information including a moving distance per the unit period of the movable body,
   the battery is a battery for movement mounted on the movable body,
   the first relationship information indicates a relationship between the moving distance of the movable body per the unit period and the deterioration degree of the battery,
   the second relationship information indicates a relationship between the elapsed time or the moving distance of the movable body, and the voltage difference generated between the plurality of cells,
   at least one of the charge plan or the discharge plan is a movement plan of the movable body, and
   the work timing is timing at which the work for use in the movement plan is performed, the work timing being timing at which the sum of the first cost and the second cost satisfies a predetermined requirement.

4. The information processing method according to claim 3, further comprising, by the information processing device:
   determining planned timing that is timing for purchase, sale, or scrapping of the movable body or the battery mounted on the movable body for use in the movement plan, the planned timing being timing at which the sum of the first cost and the second cost satisfies the predetermined requirement, on the basis of the movement information, the first relationship information, the second relationship information, the first cost information, and the second cost information; and
   causing the presentation device to present information indicating the planned timing.

5. The information processing method according to claim 3, wherein the first cost includes a cost required for purchase, sale, or scrapping of the battery having the deterioration degree equal to or higher than a threshold or of the movable body on which the battery is mounted.

6. The information processing method according to claim 1, comprising causing, by the information processing device, the presentation device to present information indicating the work timing a predetermined period before arrival of the work timing.

7. The information processing method according to claim 1, wherein
   the electric apparatus is an electric storage device,
   the information corresponding to the charge amount is a charge amount of the electric storage device and the information corresponding to the discharge amount is a discharge amount of the electric storage device,
   the first relationship information indicates a relationship between (1) at least one of a charge amount per the unit period of the electric storage device or a discharge amount per the unit period of the electric storage device and (2) the deterioration degree of the battery,
   the second relationship information indicates a relationship between the elapsed time or at least one of the charge amount of the electric storage device or the discharge amount of the electric storage device, and the voltage difference generated between the plurality of cells,
   the charge plan is a charge plan of the electric storage device and the discharge plan is a discharge plan of the electric storage device, and
   the work timing is timing at which the work for use in at least one of the charge plan or the discharge plan is performed, the work timing being timing at which the sum of the first cost and the second cost satisfies a predetermined requirement.

8. An information processing system comprising at least one processor configured to perform operations comprising:
acquiring at least one of (1) charge information indicating information corresponding to a charge amount per unit period of a battery provided in an electric apparatus driven by the battery or (2) discharge information indicating information corresponding to a discharge amount per unit period of the battery provided in the electric apparatus driven by the battery, the battery having a plurality of cells;
acquiring first relationship information indicating a relationship between the information corresponding to at least one of the charge amount per the unit period or the discharge amount per the unit period and a deterioration degree of the battery;
acquiring second relationship information indicating a relationship between an elapsed time or at least one of the charge amount or the discharge amount, and a voltage difference generated between the plurality of cells;
acquire first cost information indicating a first cost generated by deterioration of the battery and second cost information indicating a second cost required for work for reducing the voltage difference;
determining, on the basis of at least one of the charge information or the discharge information, the first relationship information, the second relationship information, the first cost information, and the second cost information, work timing at which the work in at least one of a charge plan or a discharge plan is performed, and the current information, the work timing being timing at which a sum of the first cost and the second cost satisfies a predetermined requirement; and
causing a presentation device to present information indicating the work timing.

9. An information processing method comprising, by an information processing device:
acquiring (1) charge information indicating information corresponding to a charge amount per unit period of a battery provided in an electric apparatus driven by the battery and (2) discharge information indicating information corresponding to a discharge amount per unit period of the battery provided in the electric apparatus driven by the battery, the battery having a plurality of cells;
acquiring first relationship information indicating a relationship between the information corresponding to the charge amount per the unit period and the discharge amount per the unit period and a deterioration degree of the battery;
acquiring second relationship information indicating a relationship between an elapsed time or the charge amount and the discharge amount, and a voltage difference generated between the plurality of cells;
acquiring current information including information indicating a current deterioration degree of the battery and information indicating a current voltage difference generated between the plurality of cells;
acquiring first cost information indicating a first cost generated by deterioration of the battery and second cost information indicating a second cost required for work for reducing the voltage difference;
determining, on the basis of the charge information and the discharge information, the first relationship information, the second relationship information, the first cost information, and the second cost information, work timing at which the work in a charge plan and a discharge plan is performed, and the current information, the work timing being timing at which a sum of the first cost and the second cost satisfies a predetermined requirement; and
causing a presentation device to present information indicating the work timing.

* * * * *